United States Patent
Cole et al.

(10) Patent No.: US 8,028,897 B2
(45) Date of Patent: Oct. 4, 2011

(54) DEPOSIT OF COINS INTO A FINANCIAL ACCOUNT

(75) Inventors: Kevin Cole, Charlotte, NC (US); Wanda P. Wick, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 367 days.

(21) Appl. No.: 12/349,582

(22) Filed: Jan. 7, 2009

(65) Prior Publication Data

US 2010/0174641 A1 Jul. 8, 2010

(51) Int. Cl.
G07D 11/00 (2006.01)
(52) U.S. Cl. .................................................. 235/379
(58) Field of Classification Search ........... 235/375, 235/379
See application file for complete search history.

(56) References Cited

U.S. PATENT DOCUMENTS

| | | | |
|---|---|---|---|
| 5,799,767 A | 9/1998 | Molbak | |
| 6,073,119 A | 6/2000 | Bornemisza-Wahr et al. | |
| 6,116,402 A * | 9/2000 | Beach et al. | 194/216 |
| 6,318,537 B1 * | 11/2001 | Jones et al. | 194/346 |
| 6,609,113 B1 | 8/2003 | O'Leary et al. | |
| 6,760,414 B1 | 7/2004 | Schurko et al. | |
| 7,113,929 B1 | 9/2006 | Beach et al. | |
| 2005/0121507 A1 | 6/2005 | Brown et al. | |
| 2007/0174080 A1 | 7/2007 | Outwater | |
| 2007/0290032 A1 * | 12/2007 | Main | 235/379 |
| 2009/0320106 A1 * | 12/2009 | Jones et al. | 726/5 |

FOREIGN PATENT DOCUMENTS

| | | |
|---|---|---|
| WO | 03071387 A2 | 8/2003 |
| WO | 2007138555 A2 | 12/2007 |

OTHER PUBLICATIONS

International Search Report dated Sep. 15, 2010.
International Search Report dated Apr. 21, 2010.
"Cash goes in, gift certificate comes out—Coinstar now offering gift certificates redeemable at amazon.com with no transaction fee"; XP002578856; Sep. 13, 2005; retrieved from Internet http://www.paymentsnews.com/.m/2005/09/cash_goes_in_gi.html.
European Office Action dated Jun. 10, 2011 in Application No. 10 250 024.6.

* cited by examiner

*Primary Examiner* — Thien M. Le
*Assistant Examiner* — Christle Marshall
(74) *Attorney, Agent, or Firm* — Banner & Witcoff, Ltd.; Michael A. Springs (57) ABSTRACT

Method, apparatus and system for receiving coins and generating a certificate for depositing the sum of received coins in a banking account. The user may redeem the certificate in an already existing bank account or may enroll into a new banking account and receive immediate access to the funds redeemed.

20 Claims, 5 Drawing Sheets

HTTP://WWW.REDEMPTIONCODEWEBSITE.COM

WELCOME! PLEASE ENTER IN YOUR REDEMPTION CODE IN THE BOX BELOW AND CLICK THE SUBMIT BUTTON

ENTER REDEMPTION CODE HERE: ABCDEF123456

SUBMIT

FIG. 5

DEPOSIT OF COINS INTO A FINANCIAL ACCOUNT

FIELD OF THE INVENTION

Aspects of the disclosure relate to cash handling in a cash-centric environment. More specifically, aspects of the invention relate to the deposit of coins into an account.

BACKGROUND

It is estimated that billions of dollars in coins are idly sitting in American households. This "loose change" would be better served if stored in a bank account accruing interest and/or readily available to the user, for example, when the user attempts to retrieve cash from an automated teller machine (ATM).

Currently, there are coin machines available in grocery stores that receive coins and generate a coupon for use at the grocery store or a gift certificate for use at a predetermined store. However, such machines are not desirable for use by a certain segment of the population. Teenagers, for example, might not be interested in gathering loose change around the house to just to receive a coupon for purchasing groceries or products located in that particular store. Moreover, organizing and wrapping coins in coin sheets for deposit at a bank is time consuming and inconvenient, and certain users may find that the cost to travel and the time expended to deposit the coins may be greater than any value received by depositing the coins into a bank account. Some individuals without bank accounts may find the traditional method of depositing coins even more cumbersome and time-consuming and if they must first travel to a bank, and open an account before they are able to deposit their change. What is needed is a convenient way for individuals with or without bank accounts to deposit change for immediate use.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect, a user without a bank account may deposit coins into a machine and may open an online banking account with a specified bank at the machine. Funds equaling the deposited coins may be immediately available to the user upon opening the account.

In another aspect, a user may deposit coins into a machine and may receive a certificate for redeeming an amount of money equal to the deposited coins. The user may redeem the certificate and a user-specified bank account may be credited an amount of money equal to the amount deposited.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for depositing coins in a financial account. A financial institution such as a bank may provide immediate access and use of the money deposited using the currency handling apparatus, system, and method described below in various aspects.

In addition to providing a flexible way for users to redeem coins for cash, in one example, an individual, such as a teenager, who does not have a bank account may collect spare change around the house and at other places and may deposit the funds at a coin processing machine at, for example, a school, library, or mall and may receive a code for the deposited funds. Upon returning home, the individual may input the code into a designated website and open an online bank account to store the deposited funds and possibly accrue interest on the funds. The individual may continue gathering coins and again deposit the coins at the same or different processing machines and receive a different code and, upon redeeming the second code, may deposit the funds associated with the second deposit into the online bank account previously opened at the time the first code was redeemed. Alternatively, a parent may redeem a code on behalf of a child or young relative as a gift or as an alternative to an allowance. A convenient and flexible method to deposit the coins into a new account or any one of a number of pre-existing accounts belonging to the same or different users may provide stronger motivation to gather and deposit coins in the coin processing machines.

Figure 1:
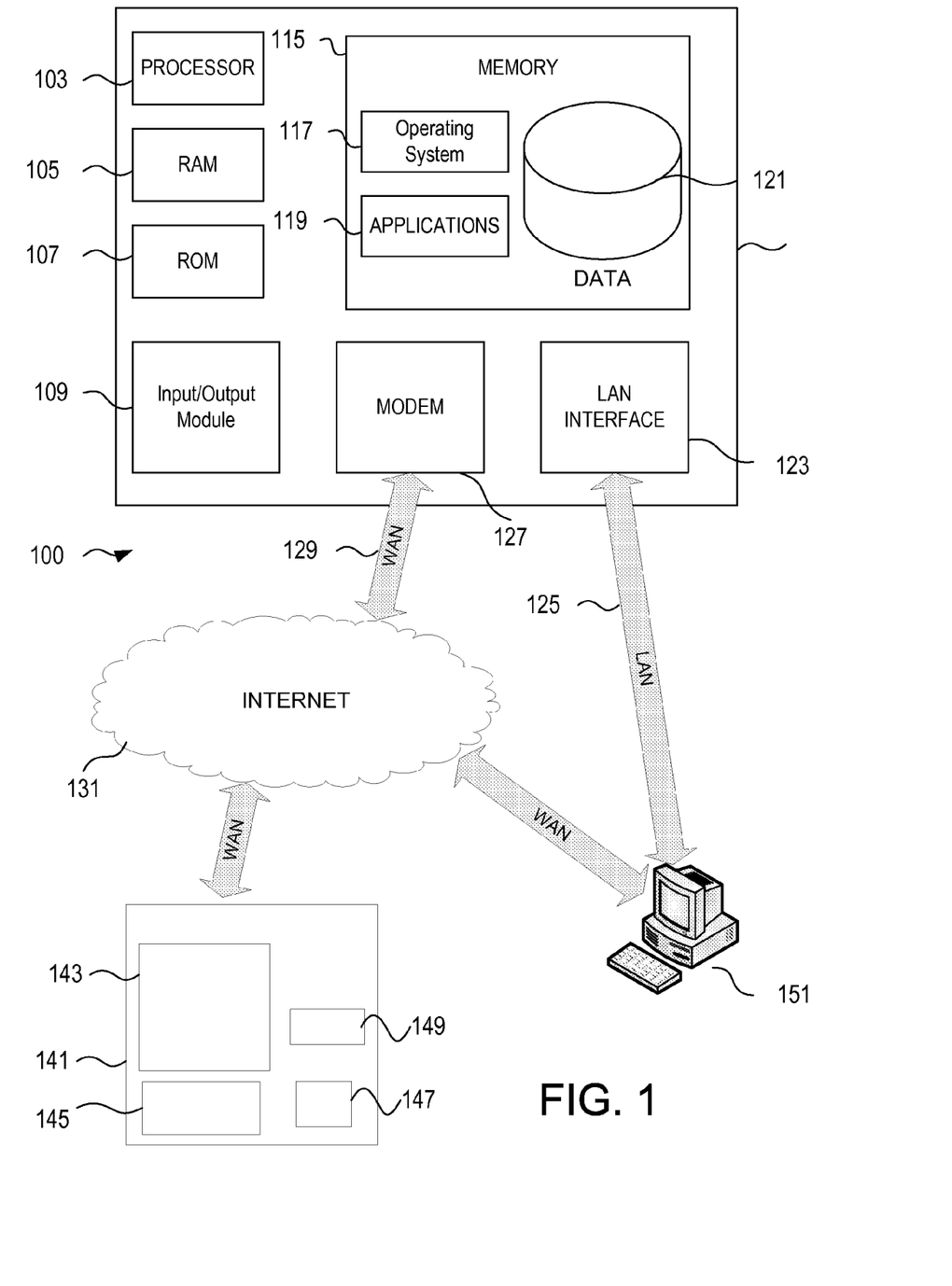
FIG. 1 illustrates an example of a suitable operating environment in which various aspects of the disclosure may be implemented.

FIG. 1 illustrates a block diagram of a computing environment 100 including a generic computing device 101 (e.g., a server, laptop computer, desktop computer, mobile communication device, and the like) that may be used according to an illustrative embodiment of the invention. The computer 101 may have a processor 103 for controlling overall operation of the server and its associated components, including RAM 105, ROM 107, input/output (I/O) module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101 computer executable instructions may be embodied in hardware or firmware (not shown). As described in detail below, the database 121 may provide centralized storage of account information and account holder information for the entire business, allowing interoperability between different elements of the business residing at different physical locations.

The computer 101 may operate in a networked environment supporting connections to one or more remote devices, such as a coin processing device 141 and a user terminal 151. The coin processing device 141 may include a I/O display 143 including soft keys for user input and a display screen for displaying messages, graphics, and the like. The coin processing device may also include a coin receiver 145 configured to receive coins from a user, a coin dispenser 147 configured to dispense coins, for example, refunding coins deposited by a user or dispensing coins inputted by a user which cannot be discerned or which may be counterfeit. The coin processing device may also include a paper dispenser 149 configured to dispense a paper receipt. In addition, the coin processing device may comprise a processor and memory (not shown) for controlling the device, and a transceiver (not shown) operable to communicate with other remote devices, such as computer 101 or a user device such as a mobile phone over the internet, a cellular network, and the like. The user terminal 151 may be a personal computer, laptop, mobile device and the like that include many or all of the elements described above relative to the computer 101. The network connections depicted in FIG. 1 include a local area network (LAN) 125 and a wide area network (WAN) 129, but may also include other networks, such as a cellular network. When used in a LAN networking environment, the computer 101 is connected to the LAN 125 through a network interface or adapter 123. When used in a WAN networking environment, the computer 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Computing device 101 and/or terminals 151 may also be mobile terminals including various other components, such as a battery, speaker, and antennas (not shown).

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In one example, the coin processing device 141 may be a COINSTAR™ machine located in a publicly-accessible location such as a grocery store or a convenience store. The coin processing device 141 may be controlled by a third party or may be controlled by the financial institution itself Additionally, the coin processing device 141 may receive and store coins from a user and may alert a coin processing manager when a storage bin within the coin processing device 141 is full or when a predetermined threshold is met. The coin processing device 141 may be configured to perform any number of functions. For example, the coin processing device 141 may receive coins and dispense a receipt indicating the amount of coins received. The coin processing device may also determine which, if any, of the coins are foreign coins, and credit the user the corresponding amount of funds based on an exchange rate. The coin processing device 141 may also verify the authenticity of coins and determine if the coins are unacceptable, for instance, due to the coin being unrecognizable or possibly fraudulent and may dispense the rejected coins back to the user. The processing device may also communicate with computer 101, for example, to update a file or database that a certain amount of coins has been deposited at the processing device 141. In addition to computer 101, the processing device 141 may also communicate with terminal 151, for example, to send an electronic receipt via text message or email message.

In one example, terminal 151 may be a customer or a potential customer's computer used to access the customer or potential customer's online banking account available on the internet. The term "user" refers to both customers and potential customers and may be used interchangeably with those terms herein. The terminal 151 may enable a user to access a financial institution's website, for example, to access the user's online bank account or to create an online bank account for the user.

As understood by those skilled in the art, the steps that follow in the figures may be implemented by one or more of the components in FIG. 1 and/or other components, including other computing devices.

The technology, such as the devices and networks described in FIG. 1 may allow a user to deposit change in a coin processing device, such as coin processing device 141, and receive a receipt with a redemption code. The user may then visit a financial website and redeem the code, whereupon redemption, the amount of change previously deposited into the coin processing device is credited to an online banking account of the user's choice and immediately accessible to the user.

Figure 2:
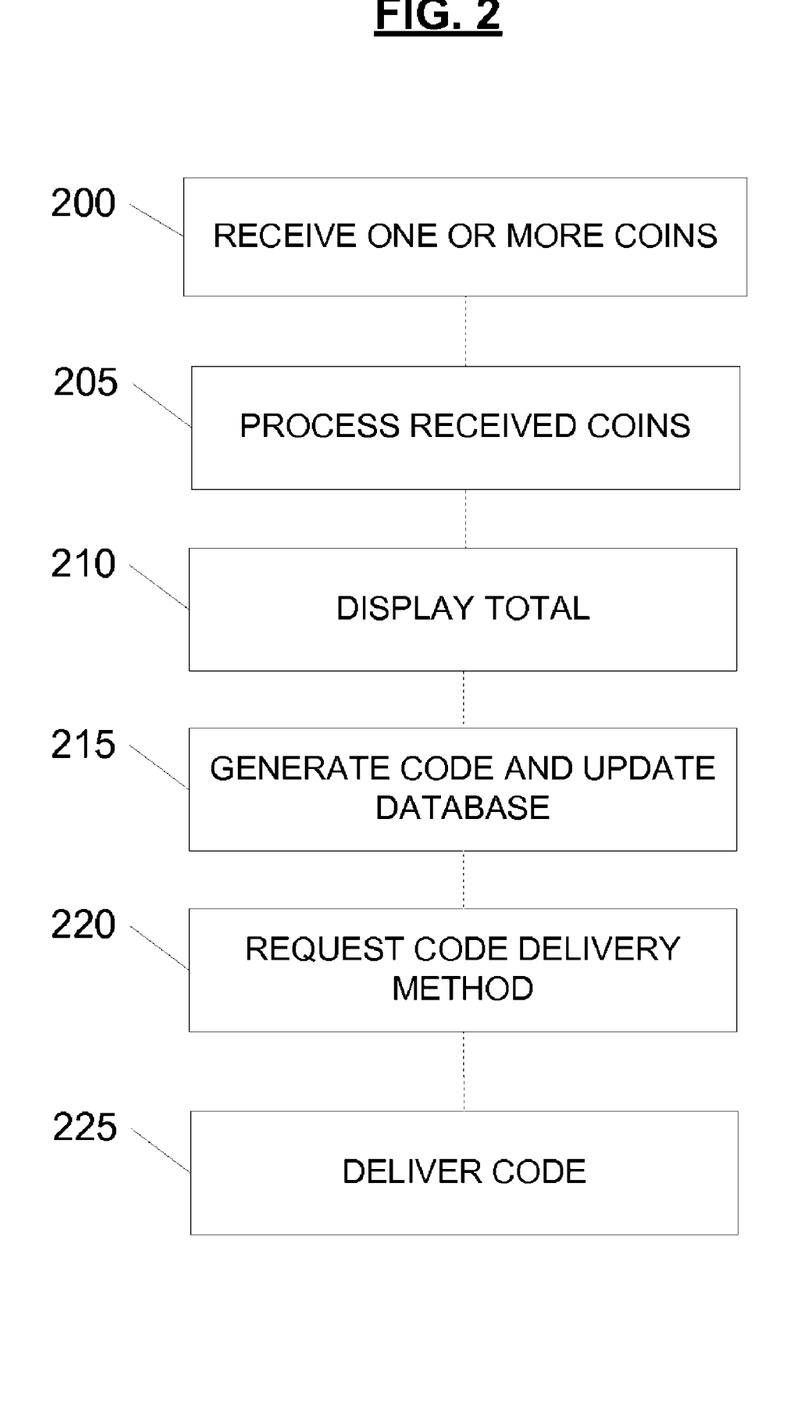
FIG. 2 illustrates a method of depositing coins and receiving a receipt with a redemption code in accordance with the illustrative embodiments discussed herein

FIG. 2 illustrates a method of depositing coins and receiving a receipt with a redemption code. At step 200, the user may deposit a plurality of coins at a coin processing device, for example, the coin processing device 141. At step 205, the coin processing device may process the received coins. Processing the received coins may include scanning, weighing, or otherwise analyzing each coin to determine the value of the coin in U.S. dollars. For example, upon determining that a coin is a quarter, the coin processing device may credit the user a value of twenty-five cents. The coin processing device may also recognize foreign currency and accordingly credit the user a value corresponding to the foreign currency received based on an exchange rate. Alternatively, the coin processing device may reject foreign currency as unrecognizable money and dispense the foreign currency back to the user. In addition, the coin processing device may determine that one or more inputted coins is unrecognizable due to wear and tear or that the coin is possibly counterfeit and may also reject and dispense those coins back to the user.

At step 210, the coin processing device may display the total sum of the coins received and request input from the user confirming the displayed total. If the user does not agree with the displayed total, the coins may be dispensed back to the user. If the user agrees with the displayed total, then at step 215, the coin processing device may generate a redemption code and update or request an update of a financial file or database of the amount of money received and the corresponding redemption code generated. At step 220, the coin processing device may request input on how the user would like to receive the redemption code. For example, the user may desire to have a paper certificate with the code included. In this situation, the coin processing device may print a receipt with the code. In another example, the user may desire to have the code emailed to a personal email address. Here, the coin processing device may attempt to email the receipt with the code to the specified address and confirm delivery. In yet another example, the user may desire to have the code sent to the user's cell phone or mobile device and may input a phone number, which, when received, may trigger a text message with the code included to be sent to the specified number. These and other options (e.g., sending postal mail to a user specified address with the code included in a letter) may all be available to the user and the user may select one or more of these code delivery options. At step 225, the code may be delivered to the user via the code delivery options selected.

In one aspect, regardless of the delivery option selected, the certificate or receipt containing the code may also include a website address in the form of a uniform resource locator (URL). The website address may be an interface (e.g., a webpage) where the user may input the redemption code. In another aspect, for example with respect to an electronic delivery method such as an email or text message, the certificate may include a link (e.g., a URL) which upon selection by the user automatically inputs the code into the appropriate field on the interface. In another aspect, the interface may be controlled by a financial institution that is the same or different from the financial institution controlling the coin processing machine where the user deposited the coins. In one example, the interface may be an online banking website.

Figure 3:
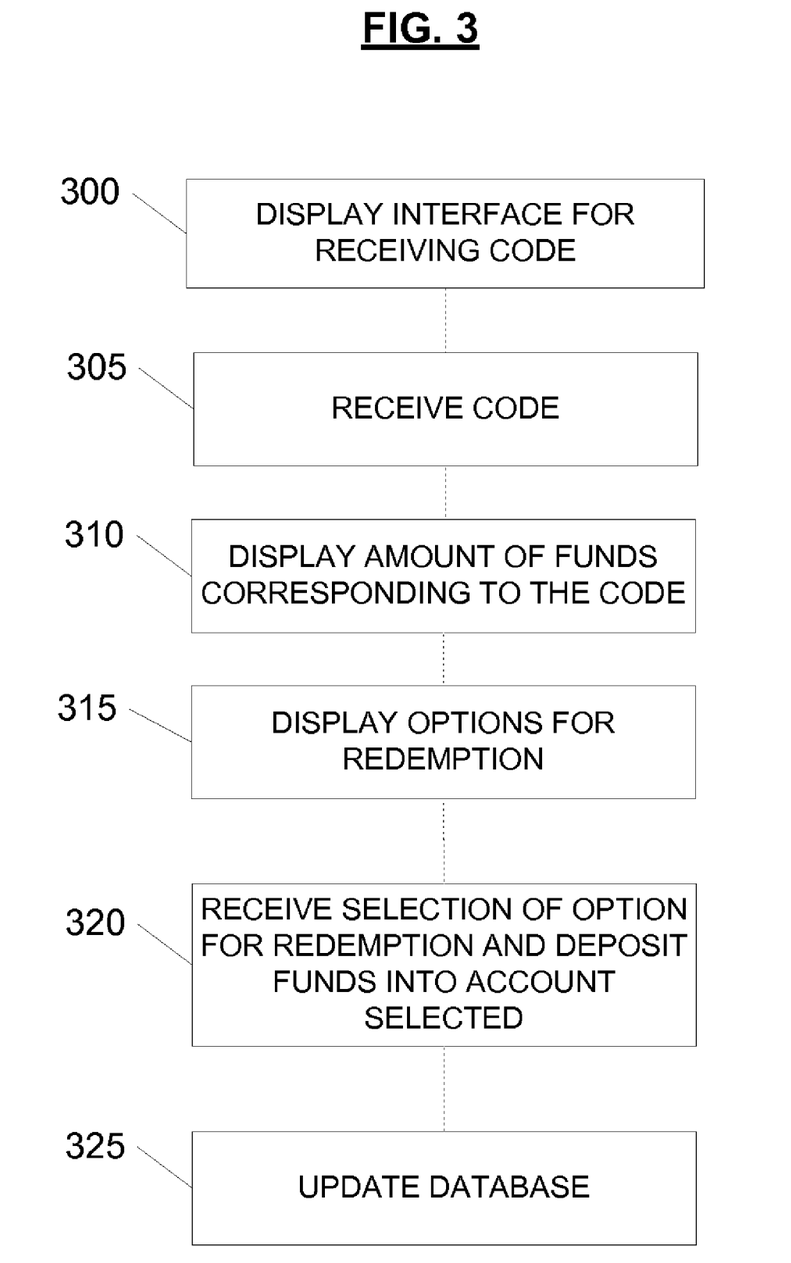
FIG. 3 illustrates a method for redeeming the code in accordance with the illustrative embodiments discussed herein
Figure 4:
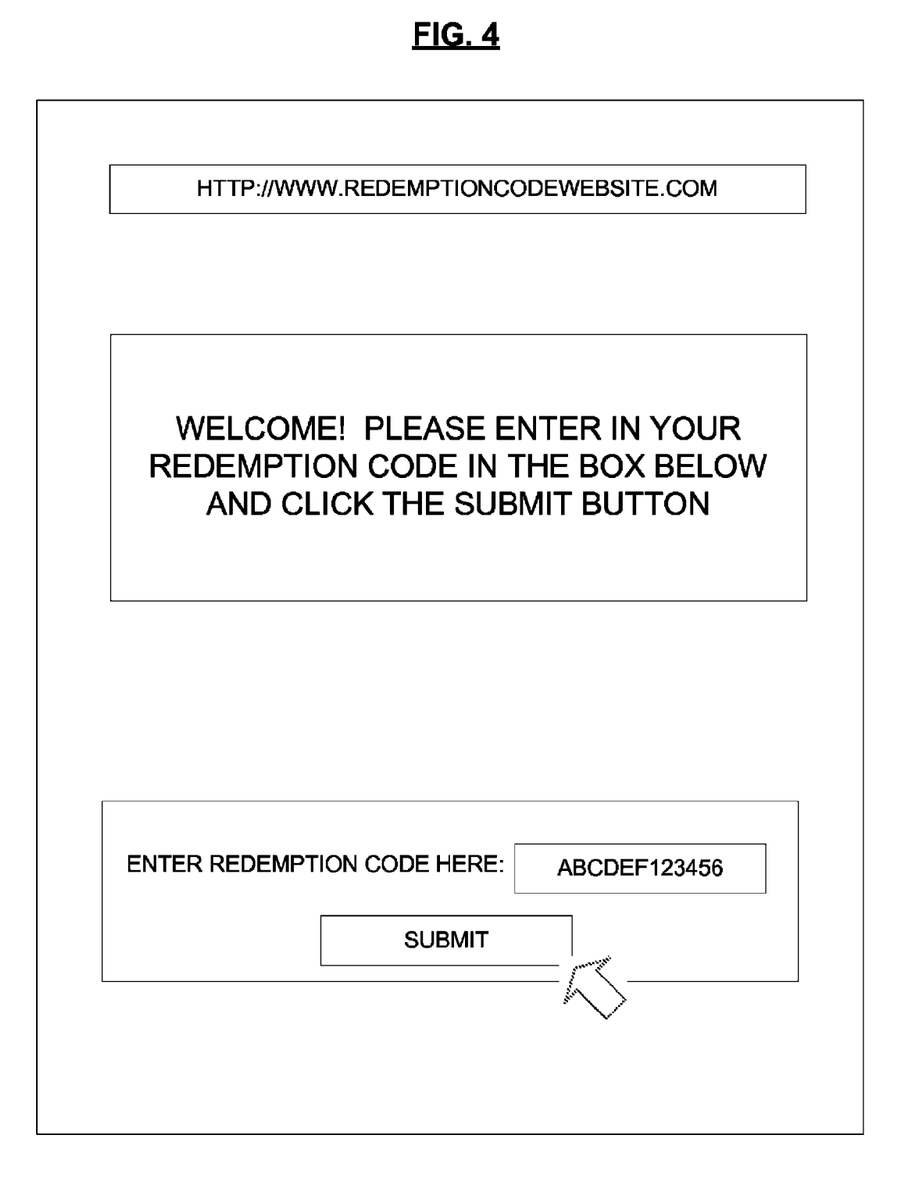
FIG. 4 is an example of an interface for redeeming the code in accordance with the illustrative embodiments discussed herein.

FIG. 3 illustrates a method for redeeming the code. The user may, for example, utilize a computer or mobile phone (e.g., terminal 151) and arrive at the interface (e.g., a webpage) for redeeming the code. In one example, the user may click on a link included in the text message containing the redemption code. In another example, the user may arrive at the interface by entering into a web browser a web address printed on the receipt received by the user when the user deposited the coins into the coin processing machine. At step 300, the interface is displayed to the user where the user may enter in the code. FIG. 4 is an example of an interface for redeeming the code.

At step 305, the user may enter the redemption code. The code may be a random alphanumeric string of characters and may be associated with the sum of money deposited into the coin processing machine. After entering in the code, the user may click on the submit button to submit the code for processing. At step 310, the interface may confirm whether the entered code is valid and may display the amount of funds corresponding to the entered code. The amount of funds corresponding to the entered code may be the same amount of funds previously deposited by the user at a coin processing device. At step 315, the interface may provide the user options for redeeming the amount of funds corresponding to the entered code. For example, the interface may present two options, one option may be an invitation to the user to open a bank account at a specified institution and deposit the funds into the new account, and the second option may an invitation to the user to deposit the funds into an already existing account. Other options may also be available, for example, choosing a different institution than a specified institution for depositing the funds.

Figure 5:
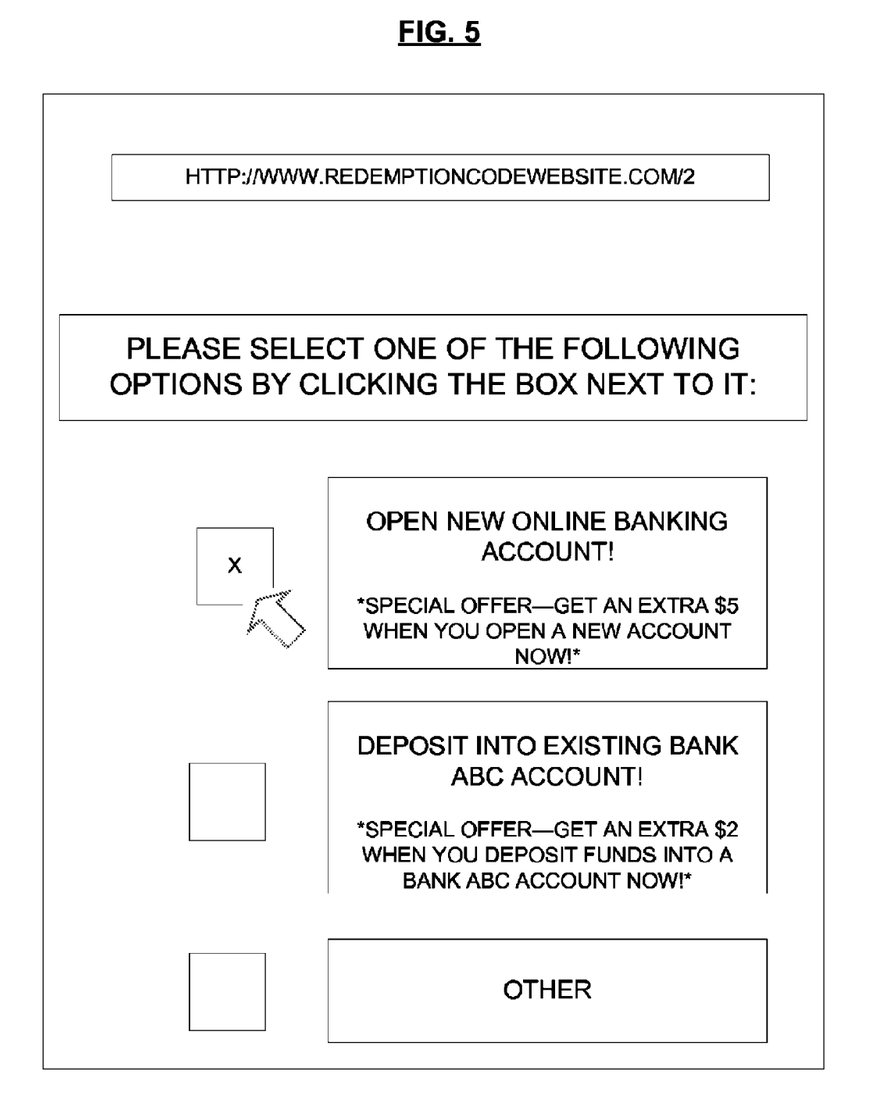
FIG. 5 illustrates an example of an interface showing bonus offers for the preferred options in accordance with the illustrative embodiments discussed herein.

Preferred options may include opening a new account or depositing the funds into an account with the specified financial institution. Selecting a preferred option may also include special offers or bonuses. For example, for users without an account at the specified financial institution, a bonus of a predetermined percentage or an amount of money may be awarded to the user if the user opens an account with the specified financial institution. Another example may be awarding interest at a predetermined rate beginning from the time the coins were deposited at the coin processing machine. For example, FIG. 5 illustrates an example of an interface showing bonus offers for the preferred options.

At step 320, the interface may receive a selection from the user of one of the available options. For example, if the user selects the option to open an online account, the account may be opened and the funds may be deposited into the account such that the user may access the funds immediately. Alternatively, the funds may be deposited into an already existing user-specified account.

A user selecting the option to open an account, such as an online banking account, may open an account at terminal 151. The user may be enrolled into an online banking account by, for example, submitting enrollment information and may request a user identification name and pass code. In response, an online banking account may be created and logged into for the user, and, in one aspect, a demonstration on how to use the features of the online banking account may be launched. After completing the demonstration, the user's online banking account may be logged off. Opening an online banking account is further described in U.S. application Ser. No. 12/141,259, entitled "Enrollment Into An Online Banking System," filed on Jun. 18, 2008, the contents of which are incorporated herein by reference in its entirety.

At step 325, the interface may update the database storing the redemption codes and the corresponding deposit amount to indicate that the code has been redeemed and is no longer valid. The interface may also store information such as account information related to the account selected or opened by the user, such as user name, address, phone number, account number, financial institution selected, and the like.

In one alternative, the user may select more than one account for depositing the funds and may specify a percentage or dollar amount to be deposited into each of the selected accounts. For example, a parent may select three accounts corresponding to each of the parent's three children and split the funds to be deposited equally among the three accounts. In one aspect, the user may only select accounts to which the user is able to provide account identification information for.

In one aspect, upon deposit of the funds into the opened or specified account, the interface may offer incentives to the user to redeem another code for the account in the near future. For example, the financial institution may offer to round up the next deposited amount to the nearest dollar provided that the deposited amount meets a certain minimum threshold, e.g., over five dollars deposit and may set an expiration date of the offer, e.g., thirty days.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method, comprising:
   receiving, by a coin processing device including a coin receiver and at least one computing device, one or more coins at the coin receiver;
   determining, by the coin processing device, an amount of money received by the coin receiver;
   generating, by the coin processing device, based on the amount of money received by the coin receiver, a redemption code;
   providing, by the coin processing device, the redemption code to a person by sending the person a text message that includes the redemption code; and
   updating, by the coin processing device, a database by associating the redemption code with the amount of money received.

2. The method of claim 1, further comprising:
   additionally providing, by the coin processing device, the redemption code to the person by sending an e-mail message to a specified e-mail address or by initiating an automated phone call to a specified phone number.

3. The method of claim 1, wherein the text message also includes a link to an online banking website.

4. The method of claim 1, further comprising:
   determining, by the coin processing device, that one or more coins received is foreign currency;
   calculating, by the coin processing device, an amount in United States dollars corresponding to the received foreign currency based on at least one current currency exchange rate; and
   updating, by the coin processing device, a data value corresponding to the amount of money received to include the amount calculated.

5. The method of claim 1, further comprising:
   determining, by the coin processing device, that one or more coins received is unrecognizable; and
   dispensing, by the coin processing device, the unrecognized one or more coins.

6. An apparatus, comprising:
   a coin receiver configured to receive coins;
   a processor;
   memory storing computer-readable instructions that, when executed by the processor, cause the apparatus to:
      determine that one or more coins have been received by the coin receiver;
      determine an amount of money received by the coin receiver;
      generate, based on the amount of money received by the coin receiver, a redemption code;
      provide, by the coin processing device, the redemption code to a person by sending the person a text message that includes the redemption code; and
      update, by the coin processing device, a database by associating the redemption code with the amount of money received.

7. The apparatus of claim 6, wherein the memory stores additional computer-readable instructions that, when executed by the processor, further cause the apparatus to:
   additionally provide the redemption code to the person by sending an e-mail message to a specified e-mail address or by initiating an automated phone call to a specified phone number.

8. The apparatus of claim 6, wherein the text message also includes a link to an online banking website configured to receive the redemption code.

9. A method, comprising:
   receiving, by a first computing device, a redemption code from a second computing device, wherein the redemption code is associated with an amount of money previously deposited at a coin processing device, and wherein the redemption code was provided by the coin processing device to a user of the second computing device via a text message that was sent to the user and included the redemption code;
   receiving, by the first computing device, a selection of an account into which the amount of money associated with the redemption code is to be deposited; and
   crediting, by the first computing device, the selected account with the amount of money associated with the redemption code, wherein the amount of money credited is immediately available for usage.

10. The method of claim 9, further comprising:
    determining, by the first computing device, that the user does not have an account with a specified financial institution; and
    causing, by the first computing device, a new account to be opened with the specified financial institution, wherein the new account is automatically selected by the first computing device as the account into which the amount of money associated with the redemption code is to be deposited.

11. The method of claim 9, wherein the redemption code is received by the first computing device in response to the user selecting, on the second computing device, a link included in the text message.

12. The method of claim 9, wherein the selected account is an account which does not belong to the user of the second computing device.

13. One or more non-transitory computer-readable media storing computer-executable instructions that, when executed, cause a first computing device to:
    receive a redemption code from a second computing device, wherein the redemption code is associated with an amount of money previously deposited at a coin processing device, and wherein the redemption code was provided by the coin processing device to a user of the second computing device via a text message that was sent to the user and included the redemption code;
    receive a selection of an account into which the amount of money associated with the redemption code is to be deposited; and credit the selected account with the amount of money associated with the redemption code, wherein the amount of money credited is immediately available for usage.

14. The one or more non-transitory computer-readable media of claim 13, having additional computer-executable instructions stored thereon that, when executed, further cause the first computing device to:
   determine that the user does not have an account with a specified financial institution; and
   cause a new account to be opened with the specified financial institution, wherein the new account is automatically selected by the first computing device as the account into which the amount of money associated with the redemption code is to be deposited.

15. The one or more non-transitory computer-readable media of claim 14, wherein the new account opened with the specified financial institution is further credited with an additional amount of money.

16. The one or more non-transitory computer-readable media of claim 13, wherein the redemption code is received by the first computing device in response to the user selecting, on the second computing device, a link included in the text message.

17. The one or more non-transitory computer-readable media of claim 13, wherein the selected account is an account which does not belong to the user of the second computing device.

18. A system comprising:
   a coin processing device;
   a user terminal; and
   a computing device, comprising:
      a processor, and
      memory storing computer-readable instructions that, when executed, cause the computing device to:
         receive a redemption code from a user terminal, wherein the redemption code is associated with an amount of money previously deposited at the coin processing device, and wherein the redemption code was provided by the coin processing device to a user of the user terminal via a text message that was sent to the user and included the redemption code;
         receive a selection of an account into which the amount of money associated with the redemption code is to be deposited; and
         credit the selected account with the amount of money associated with the redemption code, wherein the amount of money credited is immediately available for usage.

19. The system of claim 18, wherein the memory stores additional computer-readable instructions that, when executed, further cause the computing device to:
   determine that the user does not have an account with a specified financial institution; and
   cause a new account to be opened with the specified financial institution, wherein the new account is automatically selected by the computing device as the account into which the amount of money associated with the redemption code is to be deposited.

20. The system of claim 18, wherein the redemption code is received by the computing device in response to the user selecting, on the user terminal, a link included in the text message.

* * * * *